US009065896B2

(12) United States Patent
Lou et al.

(10) Patent No.: US 9,065,896 B2
(45) Date of Patent: Jun. 23, 2015

(54) METHOD AND SYSTEM FOR SAMPLING RATE MISMATCH CORRECTION OF TRANSMITTING AND RECEIVING TERMINALS

(71) Applicant: Goertek, Inc., Weifang, ShanDong Province (CN)

(72) Inventors: Shasha Lou, Weifang (CN); Bo Li, Weifang (CN); Xiaojie Wu, Weifang (CN)

(73) Assignee: Goertek, Inc., Weifang, ShanDong Province (CN)

( * ) Notice: Subject to any disclaimer, the term of this patent is extended or adjusted under 35 U.S.C. 154(b) by 0 days.

(21) Appl. No.: 14/351,225

(22) PCT Filed: May 30, 2013

(86) PCT No.: PCT/CN2013/076487
§ 371 (c)(1),
(2) Date: Apr. 11, 2014

(87) PCT Pub. No.: WO2014/005473
PCT Pub. Date: Jan. 9, 2014

(65) Prior Publication Data
US 2014/0233723 A1 Aug. 21, 2014

(30) Foreign Application Priority Data
Jul. 6, 2012 (CN) .......................... 2012 1 0233695

(51) Int. Cl.
H04J 1/16 (2006.01)
H04M 9/08 (2006.01)
G10L 21/02 (2013.01)
H04L 12/28 (2006.01)

(52) U.S. Cl.
CPC ............... H04M 9/082 (2013.01); G10L 21/02 (2013.01)

(58) Field of Classification Search
USPC ........................................ 370/252, 286, 419
See application file for complete search history.

(56) References Cited

U.S. PATENT DOCUMENTS

| 6,167,133 A * | 12/2000 | Caceres et al. ........... 379/406.13 |
| 6,563,863 B1 * | 5/2003 | Read ............................. 375/222 |
| 2010/0086122 A1 | 4/2010 | Takada | |

FOREIGN PATENT DOCUMENTS

| CN | 101819768 | 9/2010 |
| CN | 102387272 | 3/2012 |
| CN | 102780821 | 11/2012 |
| CN | 202949477 | 5/2013 |

OTHER PUBLICATIONS

PCT/CN2013/076487 Written Opinion and English Translation of Written Opinion, Sep. 5, 2013.

* cited by examiner

Primary Examiner — John Pezzlo
(74) Attorney, Agent, or Firm — Boyle Fredrickson, S.C.

(57) ABSTRACT

Disclosed in the invention is a method and system for sampling rate mismatch correction of transmitting and receiving terminals, which can obtain a high-precision sampling rate mismatch in real time, carry out sampling rate correction on transmitting and receiving terminal signals, and send the transmitting terminal signal and the receiving terminal signal that have the same sampling rate after corrected to an echo cancellation system to carry out echo cancellation. The present invention can improve the quality of echo cancellation, simplify the computation and reduce the cost. The method for sampling rate mismatch correction of transmitting and receiving terminals provided in the embodiments of the invention comprises: calculating a transfer function of a receiving terminal signal relative to a transmitting terminal signal at each sampling timing according to the transmitting and receiving terminal signals; obtaining a transmission time delay of the transmitting and receiving terminals at each sampling timing using the transfer function; obtaining a sampling rate mismatch of the transmitting and receiving terminals at each sampling timing by means of parameter fitting using the transmission time delay and the linear relationship between the transmission time delay and the sampling rate mismatch; and adjusting the sampling rate of the transmitting terminal signal or the receiving terminal signal at each sampling timing according to the sampling rate mismatch.

10 Claims, 5 Drawing Sheets

METHOD AND SYSTEM FOR SAMPLING RATE MISMATCH CORRECTION OF TRANSMITTING AND RECEIVING TERMINALS

TECHNICAL FIELD

The invention relates to the field of audio processing technology, in particular to a method and system for sampling rate mismatch correction of transmitting and receiving terminals.

BACKGROUND ART

In voice communications, in order to ensure call quality and equipment safety, echo cancellation is usually carried out. In the currently used echo cancellation methods, when the transmitting terminal signal and the receiving terminal signal are known, an echo path filter and an echo signal are calculated by these two signals and then the echo signal is cancelled from the transmitting terminal signal to prevent the communication from being interfered with echoes.

However, since most of today's communications have been digitalized, the transmitting and receiving terminal signals are both digitally transmitted. Transmitting and receiving terminal signals may have a sampling rate mismatch due to different sampling clocks, which will decrease the estimation accuracy of the echo path filter and the echo signal, resulting in degradation in the performance of echo cancellation.

In order to reduce or eliminate the impact of the sampling rate mismatch on the echo cancellation performance, it is required to calculate the sampling rate mismatch between the transmitting and receiving terminal signals and correct it before the echo is cancelled. For the calculation of the sampling rate mismatch, the existing practice is to calculate the sampling rate mismatch between the two terminals by the statistics of sampling clock cycles of the transmitting and receiving terminal signals in a period of time, or to calculate the sampling rate mismatch using a pure algorithm approach within a pre-set variation range of sampling rate mismatch, the sampling rate mismatch being within 20 Hz by default. After the sampling rate mismatch is calculated, the existing practice is usually to send the calculated sampling rate mismatch to an echo cancellation filter, and an echo cancellation system adjusts it accordingly such that the sampling rate mismatch is corrected, thereby ensuring the echo cancellation effect.

The existing practice for sampling rate mismatch correction at least has the following drawbacks:

When calculating the sampling rate mismatch, the existing practice requires monitoring the sampling clocks of the transmitting and receiving terminals, and in some cases, special hardware is also needed, such as a CPU with high-qualified performance. Thus, it has a higher requirement of hardware. Besides, the calculation is more complicated, and more storage resources are occupied. In addition, the existing practice is not immediately directed to the signals for sampling rate mismatch correction. Instead, it merely transmits the sampling rate mismatch to an echo cancellation system to adjust and process the deviation by the echo cancellation system. The manner of adjusting mismatch by an echo cancellation system increases the burden of the system and affects the echo cancellation effect.

SUMMARY OF THE INVENTION

The present invention provides a method and system for sampling rate mismatch correction of transmitting and receiving terminals to solve the problem of either requiring a higher configuration on hardware or involving tedious calculations and narrower adaptive scope in the existing solutions, and the problem of resulting in a heavier burden on the echo cancellation system in the existing solutions because the sampling rate mismatch correction is not immediately directed to signals.

To achieve the above object, the embodiment of the present invention, employs the following technical solutions:

The embodiments of the present invention provide a method for sampling rate mismatch correction of transmitting and receiving terminals, the method comprising: calculating a transfer function of a receiving terminal signal relative to a transmitting terminal signal at each sampling timing according to the transmitting and receiving terminal signals; obtaining a transmission time delay of the transmitting and receiving terminals at each sampling timing using the transfer function; obtaining a sampling rate mismatch of the transmitting and receiving terminals at each sampling timing by means of parameter fitting using the transmission time delay and the linear relationship between the transmission time delay and the sampling rate mismatch; and adjusting the sampling rate of the transmitting terminal signal or the receiving terminal signal at each sampling timing according to the sampling rate mismatch, to achieve the sampling rate correction, and inputting the transmitting terminal signal and the receiving terminal signal that have the same sampling rate after corrected to an echo cancellation system such that the echo cancellation system directly uses the transmitting terminal signal and the receiving terminal signal that have the same sampling rate after corrected to carry out echo cancellation.

The embodiments of the present invention further provide a system for sampling rate mismatch correction of transmitting and receiving terminals, the system comprising: a time delay estimator, a sampling rate mismatch estimator, and a sampling rate adjustor, wherein the input of the time delay estimator is coupled to a transmitting terminal signal and a receiving terminal signal, the output of the time delay estimator is connected to the input of the sampling rate mismatch estimator, the output of the sampling rate mismatch estimator is connected to the input of the sampling rate adjustor, the input of the sampling rate adjustor is also coupled to the transmitting terminal signal or the receiving terminal signal, and the output of the sampling rate adjustor is connected to an echo cancellation system.

The time delay estimator is configured to calculate a transfer function of the receiving terminal signal relative to the transmitting terminal signal at each sampling timing according to the transmitting and receiving terminal signals, and obtain a transmission time delay of the transmitting and receiving terminals at each sampling timings using the transfer function.

The sampling rate mismatch estimator is configured to obtain a sampling rate mismatch of the transmitting and receiving terminals at each sampling timing by means of parameter fitting using the transmission time delay and the linear relationship between the transmission time delay and the sampling rate mismatch.

The sampling rate adjustor is configured to adjust the sampling rate of the transmitting terminal signal or the receiving terminal signal at each sampling timing according to the sampling rate mismatch, to achieve sampling rate correction, and input the transmitting terminal signal and the receiving terminal signal that have the same sampling rate after corrected to an echo cancellation system such that the echo cancellation system directly uses the transmitting terminal signal and the receiving terminal signal that have the same sampling rate after corrected to carry out echo cancellation.

The embodiments of the invention have following beneficial effects:

The embodiments of the invention use the characteristic that the transmission time delay and the sampling rate mismatch have a linear relationship, and adopt the technical means of obtaining the transmission time delay between the transmitting and receiving terminals based on the transmitting and receiving terminal signals and parameter fitting a sampling rate mismatch between the transmitting and receiving terminals, thus a high-precision sampling rate mismatch can be obtained in real time without additional hardware cost. The calculation method is simple, and the system cost is reduced. Further, since this solution uses the technical means of correcting the sampling rate mismatch before carrying out echo cancellation, the burden on the echo cancellation system is reduced and the quality of the echo cancellation is improved.

DETAILED DESCRIPTION OF THE EMBODIMENTS

To make the purpose, technical solution and advantages of the invention more apparent, the embodiments of the invention will be described in further detail with reference to the drawings.

Figure 1:
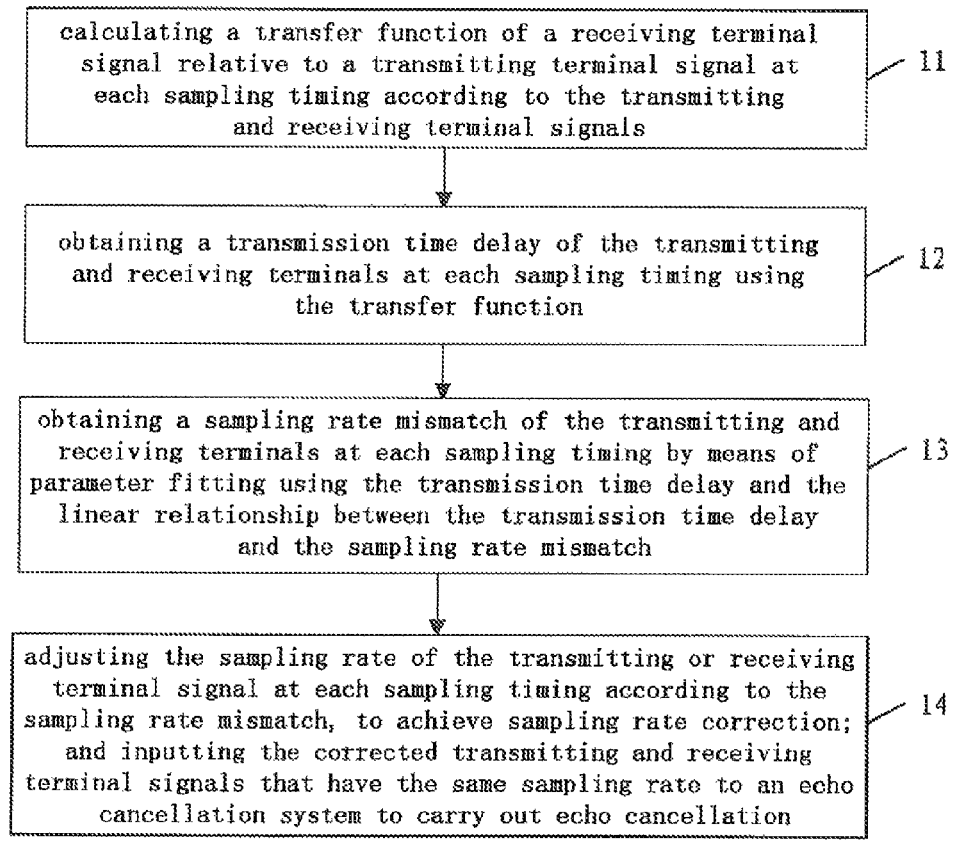
FIG. 1 is a flow chat of the method for sampling rate mismatch correction of transmitting and receiving terminals as provided by Embodiment 1 of the invention.

Referring to FIG. 1, Embodiment 1 of the invention provides a method for sampling rate mismatch correction of transmitting and receiving terminals, the method comprising:

11: calculating a transfer function of a receiving terminal signal relative to a transmitting terminal signal at each sampling timing according to the transmitting and receiving terminal signals;

12: obtaining a transmission time delay of the transmitting and receiving terminals at each sampling timing using the transfer function;

13: obtaining a sampling rate mismatch of the transmitting and receiving terminals at each sampling timing by means of parameter fitting using the transmission time delay and the linear relationship between the transmission time delay and the sampling rate mismatch; and

14: adjusting the sampling rate of the transmitting terminal signal or the receiving terminal signal at each sampling timing according to the sampling rate mismatch, to achieve sampling rate correction; and inputting the transmitting terminal signal and the receiving terminal signal that have the same sampling rate after corrected to an echo cancellation system such that the echo cancellation system directly uses the transmitting terminal signal and the receiving terminal signal that have the same sampling rate after corrected to carry out echo cancellation.

The embodiments of the invention use the characteristic that the transmission time delay and the sampling rate mismatch have a linear relationship. Herein, the following analysis will explain the principle that the sampling rate mismatch can be corrected using the above characteristic:

If a sampling rate mismatch exists between the transmitting and receiving terminals, then at a sampling timing n, the relative transmission time delay between the receiving terminal and the transmitting terminal will be a linear function at the sampling timing, which can be expressed as $$dFs = \frac{FsS - FsR}{FsR}$$

where, FsR is the sampling frequency of the receiving terminal, FsS is the sampling frequency of the transmitting terminal, and dFs is the sampling rate mismatch.

If the transmission time delay between the transmitting and receiving terminals at the sampling timing n is indicated by D[n], then D[n] and n comply with the following linear relationship:

$$D[n]=n \cdot dFs+c$$

where, c is a constant determined by the transmission environment.

Figure 2A:
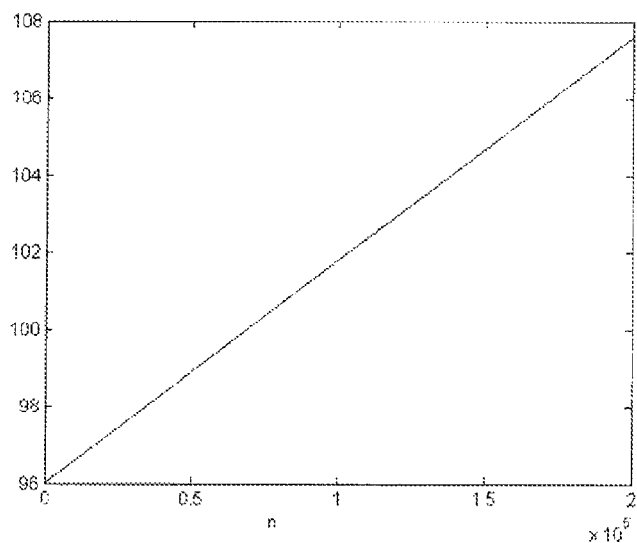
FIG. 2A is a schematic diagram of the relationship between the transmission time delay and the sampling timing when the sampling rate mismatch is constant as provided by the embodiments of the invention.
Figure 2B:
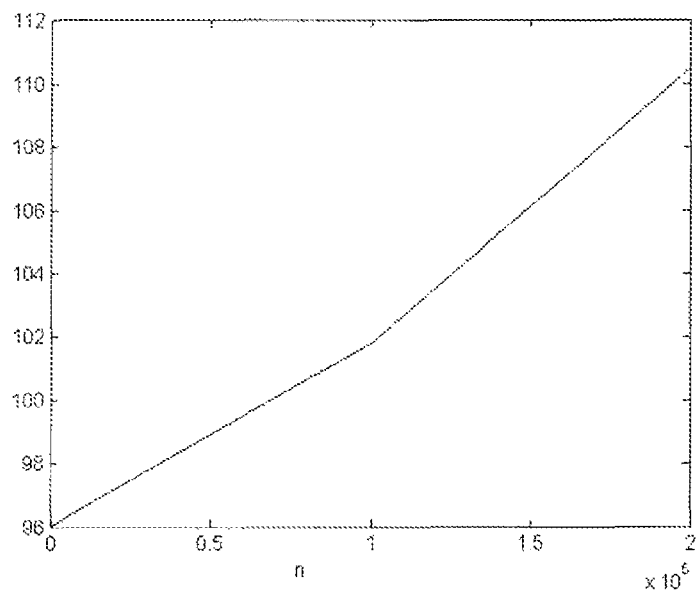
FIG. 2B is a schematic diagram of the relationship between the transmission time delay and the sampling timing when the sampling rate mismatch varies changing as provided by the embodiments of the invention.

Referring to FIG. 2A, the diagram shows the relationship between D[n] and n when the sampling rate mismatch is constant. The abscissa in the drawing is the sampling timing, the ordinate is the transmission time delay, and the slope of the straight line is the sampling rate mismatch. When the sampling rate mismatch changes, the slope changes as well. FIG. 2B shows the diagram of the relationship between D[n] and n when the sampling rate mismatch changes (non-constant).

As can be seen from the above, if D[n] can be obtained, dFs can be estimated from D[n] and n, and the transmitting terminal signal or the receiving terminal signal can be corrected according to dFs. If the estimation is in real-time, when the sampling rate mismatch changes, we can track and adapt to the change, thereby achieving the real-time online correction of the sampling rate mismatch of the transmitting and receiving terminals.

The embodiments of the invention use the characteristic that the transmission time delay and the sampling rate mismatch have a linear relationship, and adopt the technical means of obtaining the transmission time delay between the transmitting and receiving terminals based on the transmitting and receiving terminal signals and parameter fit a sampling rate mismatch between the transmitting and receiving terminals, thus a high-precision sampling rate mismatch can be obtained in real time without additional hardware cost. The calculation method is simple, and the system cost is reduced. Further, since this solution uses the technical means of correcting the sampling rate mismatch before echo cancellation, the burden on the echo cancellation system is reduced and the quality of the echo cancellation is improved.

Based on the embodiment shown in FIG. 1, further, the above step 11 in this embodiment specifically comprises: for each current sampling timing, generating a transmitting terminal data frame using the transmitting terminal signal of the current sampling timing and a predetermined number of transmitting terminal signals before the current sampling timing; generating a receiving terminal data frame of the current sampling timing using the receiving terminal signal of the current sampling timing and a predetermined number of receiving terminal signals before the current sampling timing; and calculating a transfer function of a receiving terminal signal relative to a transmitting terminal signal at the current sampling timing using the transmitting terminal data frame and the receiving terminal data frame of the current sampling timing.

Further, in step 11, the transfer function of the receiving terminal signal relative to the transmitting terminal signal of the current sampling timing is calculated using the transmitting terminal data frame and the receiving terminal data frame of the current sampling timing by the following formula:

$$h = ifft(H)$$
$$H = \frac{E(X^*[k]Y[k])}{E(X^*[k]X[k])}$$

where, h is the transfer function, $X[k]$ is the frequency domain form of the receiving terminal data frame $\vec{x}[n]$ of the current sampling timing n, $Y[k]$ is the frequency domain form of the transmitting terminal data frame $\vec{y}[n]$ of the current sampling timing n, H is the frequency domain form of the transfer function h, $X^*[k]$ is a conjugate of $X[k]$, $E(\cdot)$ indicates expectation calculation, $ifft(\cdot)$ represents inverse Fourier transform.

Further, the above step 12 specifically comprises: for each current sampling timing, selecting the time point, to which the maximum absolute value of the transfer function of the current sampling timing corresponds, as a transmission time delay estimation value of the transmitting and receiving terminals of the current sampling timing; and obtaining the transmission time delay of the current sampling timing according to the transmission time delay estimation value, for example, using the obtained transmission time delay estimation value directly as the used transmission time delay of the transmitting and receiving terminals of the current sampling timing.

Further, the above step 13 specifically comprises: for each current sampling timing, generating a transmission time delay data frame of the current sampling timing using the transmission time delay of the transmitting and receiving terminals of the current sampling timing and a predetermined amount of transmission time delay of the transmitting and receiving terminals before the current sampling timing; and obtaining the sampling rate mismatch of the transmitting and receiving terminals of the current sampling timing by parameter fitting each of the elements in the transmission time delay data frame relative to each sampling timing based on the linear relationship between the transmission time delay and the sampling rate mismatch.

Further, the above step 14 specifically comprises: for each current sampling timing, resampling the transmitting terminal signal by means of interpolation according to the sampling rate mismatch of the transmitting and receiving terminals of the current sampling timing, and obtaining a transmitting terminal signal that has the same sampling rate as the sampling rate of the receiving terminal signal at the current sampling timing;

or, resampling the receiving terminal signal by means of interpolation according to the sampling rate mismatch of the transmitting and receiving terminals of the current sampling timing, and obtaining a receiving terminal signal that has the same sampling rate as the sampling rate of the transmitting terminal signal at the current sampling timing. The interpolation may be polynomial interpolation, linear interpolation or the like.

Embodiment 2 of the invention describes, with reference to the specific implementing devices, the solution for sampling rate mismatch correction of transmitting and receiving terminals provided by the embodiment.

Figure 3:
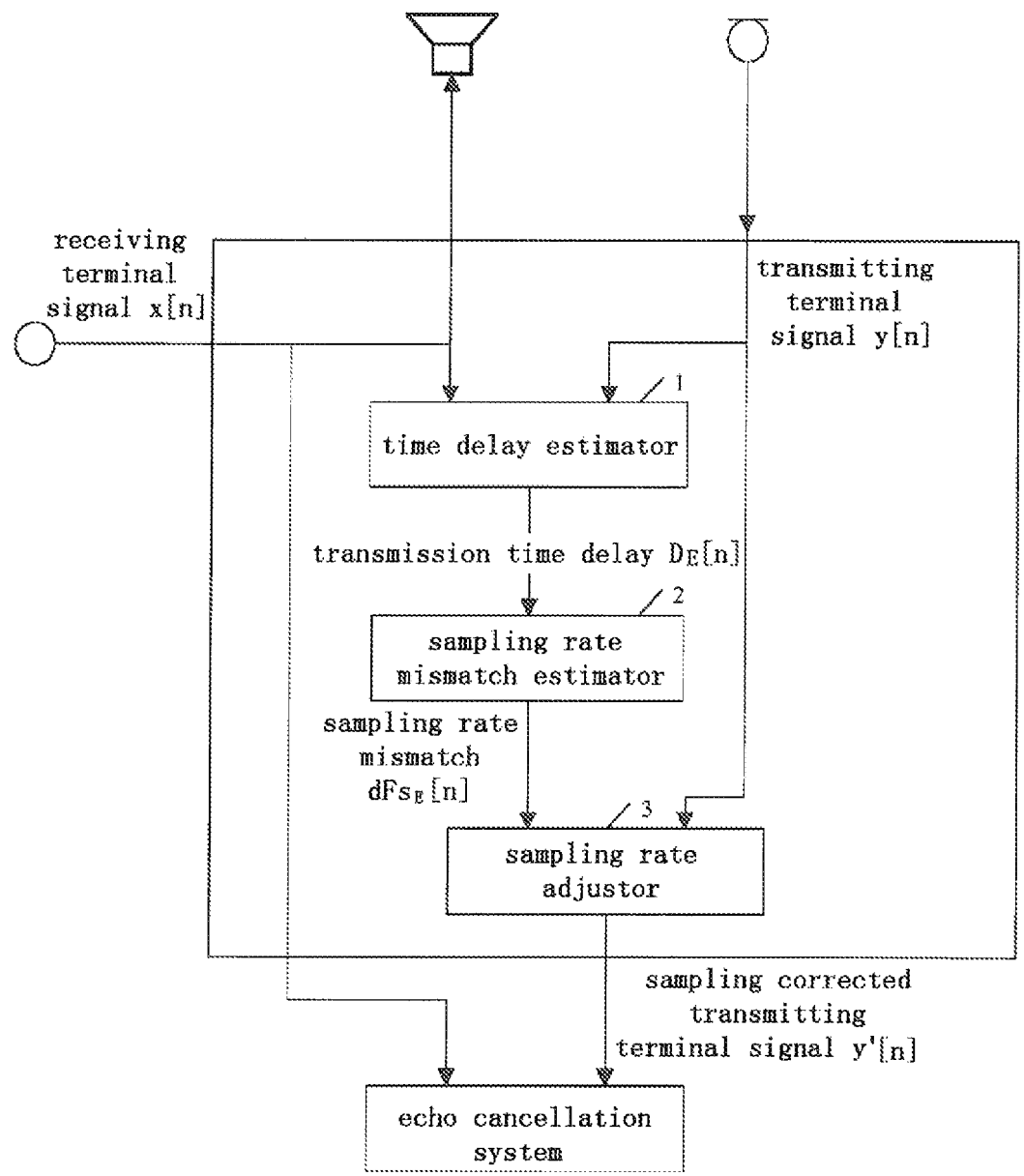
FIG. 3 is a structure diagram of the system for sampling rate mismatch correction as provided by Embodiment 2 of the invention.

FIG. 3 shows a system for sampling rate mismatch correction provided by this embodiment, the system comprises a time delay estimator 1, a sampling rate mismatch estimator 2, and a sampling rate adjustor 3. Since the receiving terminal signal and the transmitting terminal signal in the system are both digitally transmitted, the transmitting terminal is correspondingly provided with an Analog-to-Digital converter to convert the collected analog signal y(t) of the transmitting terminal to a digital signal y[n]. The transmitting terminal (digital) signal y[n] and the receiving terminal (digital) signal x[n] are coupled to the input of the time delay estimator 1. The output of the time delay estimator 1 is connected to the input of the sampling rate mismatch estimator 2. The transmission time delay $D_E[n]$ output from the output of the time delay estimator 1 is transmitted to the input of the sampling rate mismatch estimator 2.

The output of the sampling rate mismatch estimator 2 is connected to the input of the sampling rate adjustor 3. The sampling rate mismatch $dFs_E[n]$ output from the output of the sampling rate mismatch estimator 2 is transmitted to the input of the sampling rate adjustor 3. The output of the sampling rate adjustor 3 is connected to an echo cancellation system.

It should be noted that in the scenario shown in FIG. 3, the transmitting terminal signal is corrected using the obtained sampling rate mismatch, thereby obtaining transmitting and receiving terminal signals that have the same sampling rate. Thus, in this scenario, the input of the sampling rate adjustor is also coupled to the transmitting terminal signal, and the corrected transmitting terminal signal y'[n] and the receiving terminal signal x[n] are transmitted to the input of the echo cancellation system.

In the example shown in FIG. 3, the sampling frequency of the transmitting terminal signal is corrected using the sampling rate adjustor. In an alternative embodiment, the sampling frequency of the receiving terminal signal can also be corrected using the sampling rate adjustor. This embodiment will be described mainly with the former as an example. In the scenario where the receiving terminal signal is corrected using the obtained sampling rate mismatch, the input of the sampling rate adjustor needs to be coupled to a receiving terminal signal rather than a transmitting terminal signal. In this scenario, the transmitting terminal signal y[n] and the corrected receiving terminal signal x'[n] are transmitted to the input of the echo cancellation system.

The time delay estimator 1 is configured to calculate a transfer function of the receiving terminal signal relative to the transmitting terminal signal at each sampling timing according to the transmitting and receiving terminal signals, and obtain a transmission time delay of the transmitting and receiving terminals at each sampling timing using the transfer function.

The sampling rate mismatch estimator 2 is configured to obtain a sampling rate mismatch of the transmitting and receiving terminals at each sampling timing by means of parameter fitting using the transmission time delay and the linear relationship between the transmission time delay and the sampling rate mismatch.

The sampling rate adjustor 3 is configured to adjust the sampling rate of the transmitting terminal signal or the receiving terminal signal at each sampling timing according to the sampling rate mismatch to achieve sampling rate correction, and input the corrected transmitting terminal signal and the corrected receiving terminal signal that have the same sampling rate to an echo cancellation system to carry out echo cancellation.

As can be seen from above, in this embodiment, the transmitting terminal signal or the receiving terminal signal is sent to an echo cancellation system after the sampling rate of it has been corrected, that is, the contents input into the echo cancellation system are the transmitting and receiving terminal signals that have the same sampling frequency. This embodiment utilizes the mode of carrying out echo cancellation after obtaining the transmitting and receiving terminal signals that have the same sampling frequency, which helps to improve the echo eliminating effect and reduces the burden on the echo cancellation system in the back end of the data processing.

Figure 4:
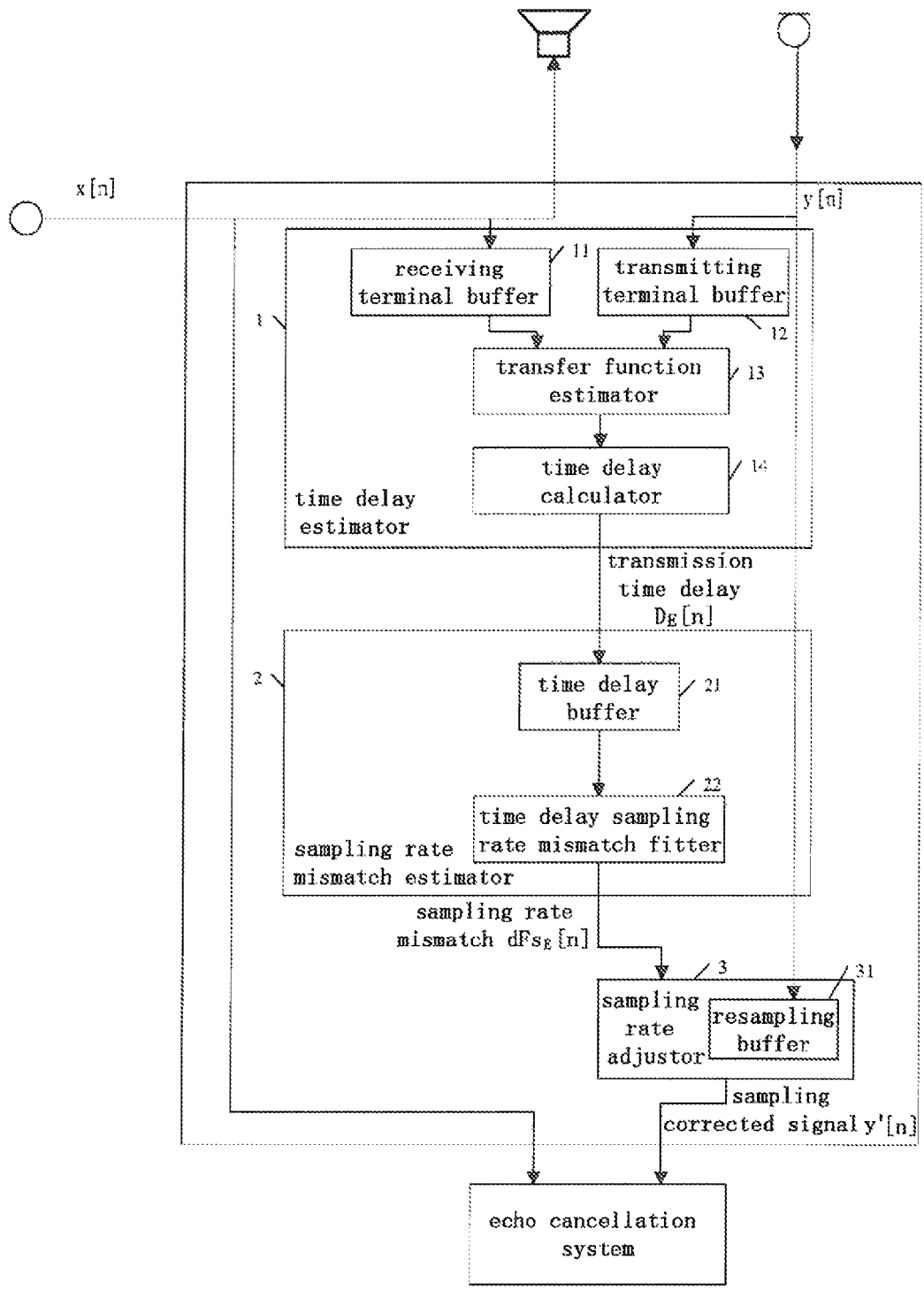
FIG. 4 is a structure diagram of another system for sampling rate mismatch correction as provided by Embodiment 2 of the invention.

FIG. 4 shows the specific structure of the respective devices in FIG. 3. The operation for sampling rate correction by these devices mainly comprises the following three sections:

I. Time Delay Estimation

The operation in this section is implemented mainly by the time delay estimator. Referring to FIG. 4, the transmitting terminal digital signal y[n] and the receiving terminal digital signal x[n] pass through a buffer and form a transmitting terminal data frame $\vec{y}[n]$ and a receiving terminal data frame $\vec{x}[n]$, respectively, which are expressed as follows:

$$\vec{x}[n]=(x[n-L+1]\ldots x[n-1]x[n])$$

$$\vec{y}[n]=(y[n-L+1]\ldots y[n-1]y[n])$$

where, n is the sampling timing, L is the length of the data frame, i.e. the number of the elements in the data frame.

The time delay estimator 1 comprises a receiving terminal buffer 11, a transmitting terminal buffer 12, a transfer function estimator 13 and a time delay calculator 14.

The transmitting terminal buffer 12 is configured to buffer the transmitting terminal signal at each sampling timing. The receiving terminal buffer 11 is configured to buffer the receiving terminal signal of each sampling timing.

The transfer function estimator 13 is configured to generate, for each current sampling timing, a transmitting terminal data frame of the current sampling timing using the transmitting terminal signal of the current sampling timing and a predetermined number of transmitting terminal signals before the current sampling timing in the transmitting terminal buffer; generate a receiving terminal data frame of the current sampling timing using the receiving terminal signal of the current sampling timing and a predetermined number of receiving terminal signals before the current sampling timing in the receiving terminal buffer, and calculate a transfer function of the receiving terminal signal relative to the transmitting terminal signal of the current sampling timing using the transmitting terminal data frame and the receiving terminal data frame of the current sampling timing.

The predetermined number is L−1, that is, the transfer function estimator 13 of the time delay estimator 1 generates a transmitting terminal data frame $\vec{y}[n]$ of the current sampling timing using the transmitting terminal signal y[n] of the current sampling timing and L−1 transmitting terminal signals before the current sampling timing, and generates a receiving terminal data frame $\vec{x}[n]$ of the current sampling timing using the receiving terminal signal x[n] of the current sampling timing and L−1 receiving terminal signals before the current sampling timing. The specific value of L is related to the output time delay limitation of the system, for example, L may be 256, 512 or the like.

The data frames $\vec{x}[n]$ and $\vec{y}[n]$ are sent to the input of the transfer function estimator 13 to calculate the transfer function h from $\vec{y}[n]$ to $\vec{x}[n]$. The transfer function estimator 13 calculates a transfer function of the receiving terminal signal relative to the transmitting terminal signal of the current sampling timing using the transmitting terminal data frame and the receiving terminal data frame of the current sampling timing by means of the following calculation means. The transfer function may be calculated by means of dividing complementary power spectrum by self-power spectrum. The specific formula is as follows:

$$h = ifft(H)$$

$$H = \frac{E(X^*[k]Y[k])}{E(X^*[k]X[k])}$$

where, h is the transfer function, X[k] is the frequency domain form of the receiving terminal data frame $\vec{x}[n]$ of the current sampling timing n, Y[k] is the frequency domain form of the transmitting terminal data frame $\vec{y}[n]$ of the current sampling timing n, H is the frequency domain form of the transfer function h, X*[k] is a conjugate of X[k], E(•) indicates expectation calculation, ifft(•) represents inverse Fourier transform.

The transfer function calculated by the transfer function estimator 13 is input into the time delay calculator 14. The time delay calculator 14 selects, for each current sampling timing, the time point, to which the maximum absolute value of the transfer function of the current sampling timing corresponds, as a transmission time delay estimation value of the transmitting and receiving terminals of the current sampling timing, and obtains the used transmission time delay of the transmitting and receiving terminals of the current sampling timing according to the transmission time delay estimation value.

This embodiment selects the value of h parameter (parameter of time), to which the location of the maximum absolute value of h corresponds, as the time delay estimation value $D_E[n]$ of the transmitting and receiving terminal signals.

$$D_E[n]=\operatorname{argmax}[|h|]$$

where, arg max is the mathematical operation of the location of the maximum value.

There is random estimation error err[n] between $D_E[n]$ and the actual value D[n], which satisfies the following relation:

$$D_E[n]=D[n]+\operatorname{err}[n],$$

where err[n] is the random estimation errors, the mean of which is 0.

$D_E[n]$ and the sampling timing n satisfies the relation:

$$D_E[n]=n\cdot dFs+c+\operatorname{err}[n]$$

From the above, by the calculation of the time delay estimator 1, the corresponding transmission time delay $D_E[n]$ of the transmitting and receiving terminals can be calculated for each of the sampling timings n.

Note: Since this embodiment uses the manner of estimating the transmission time delay using a signal of the current sampling timing and signals before the current sampling timing, for the initial sampling timing, the value of the signal before the initial sampling timing can be regarded as a default value (e.g., 0).

II. Sampling Rate Mismatch Estimation

The operation of this section is implemented mainly by the sampling rate mismatch estimator. Referring to FIG. 4, the sampling rate mismatch estimator comprises a time delay buffer 21 and a time delay sampling rate mismatch fitter 22. The calculated transmission time delay $D_E[n]$ is sent into the time delay buffer 21 of the sampling rate mismatch estimator to form a transmission time delay data frame $\vec{D}_E[n]$. The data frame formed at the corresponding sampling timing is recorded as $\vec{n}$. There is:

$$\vec{D}_E[n]=(D_E[n-M+1]\ldots D_E[n-1]D_E[n])$$

$$\vec{n}=(n-M+1\ldots n-1n)$$

where, M is the length of the data frame. M reflects the length of observation time. In this embodiment, the extension of the observation time can improve the accuracy in fitting.

From the above, the time delay buffer 21 in the sampling rate mismatch estimator 2 is configured to buffer the transmission time delay of the transmitting and receiving terminals of each sampling timing. The time delay sampling rate mismatch fitter 22 is configured to generate, for each current sampling timing, a transmission time delay data frame of the current sampling timing using a transmission time delay of the transmitting and receiving terminals of the current sampling timing and a predetermined number of transmission time delays of the transmitting and receiving terminals before the current sampling timing in the time delay buffer, and obtain a sampling rate mismatch of the transmitting and receiving terminals of the current sampling timing by parameter fitting each of the elements in the transmission time delay data frame relative to each sampling timing according to the linear relationship between the transmission time delay and the sampling rate mismatch.

That is to say, the time delay sampling rate mismatch fitter 22 generates a transmission time delay data frame $\vec{D}_E[n]$ of the current sampling timing using a transmission time delay $D_E[n]$ of the transmitting and receiving terminals of the current sampling timing n and M−1 transmission time delays of the transmitting and receiving terminals before the current sampling timing. Then, the time delay sampling rate mismatch fitter 22 is used to parameter fit each of the elements in the transmission time delay data frame relative to each sampling timing according to the linear relationship between the transmission time delay and the sampling rate mismatch, so as to obtain a sampling rate mismatch of the transmitting and receiving terminals of the current sampling timing. $\vec{D}_E[n]$ and $\vec{n}$ are sent to the time delay sampling rate mismatch fitter to estimate the slope of $\vec{D}_E[n]$ relative to $\vec{n}$. This slope is the estimated sampling rate mismatch $dFs_E$.

The fitting can be made by means of least square fitting, maximum likelihood fitting or other parameter fitting.

When using the least square fitting, the specific calculation formula can be expressed as follows:

$$dFs_E = \frac{\sum_{k=n-M+1}^{n}\left(k-\frac{2n-M+1}{2}\right)(D_E[k]-E(\vec{D}_E[n]))}{\mathrm{Var}(\vec{n})}$$

where, $dFs_E$ is the sampling rate mismatch, $E(\cdot)$ indicates expectation calculation, and $\mathrm{Var}(\cdot)$ indicates variance calculation.

The estimation accuracy of the least square fitting and other parameter fitting will be improved with the increase of M. That is to say, if the observation time M is extended, the estimation accuracy of $dFs_E$ will be improved.

By the above operation, the sampling rate mismatch can be calculated in real time for each sampling timing n.

III. Sampling Rate Adjustment

The operation in this section is implemented mainly by the sampling rate adjustor 3. The sampling rate adjustor 3 corrects the sampling rate of the transmitting terminal signal or the receiving terminal signal of each sampling timing according to the sampling rate mismatch such that the echo cancellation system carries out echo cancellation using the transmitting terminal signal and the receiving terminal signal that have the same sampling rate after corrected.

Specifically, at each sampling timing, the sampling rate adjustor 3 resamples the transmitting terminal signal or the receiving terminal signal of the current sampling timing according to the sampling rate mismatch of the current sampling timing so as to obtain a transmitting terminal signal and a receiving terminal signal having the same sampling rate at the current sampling timing.

Further, the sampling rate adjustor 3 comprises a resampling buffer 31. When the input of the sampling rate adjustor 3 is coupled to a transmitting terminal signal, e.g. the scenario shown in FIG. 4 where the sampling rate adjustor 3 comprises a resampling buffer 31 for buffering the transmitting terminal signal of each sampling timing. Herein the sampling rate adjustor 3 is specifically for resampling, for each current sampling timing, a transmitting terminal signal in the resampling buffer 31 by means of interpolation according to the sampling rate mismatch of the transmitting and receiving terminals of the current sampling timing, so as to obtain a transmitting terminal signal that has the same sampling rate as the sampling rate of the receiving terminal signal at the current sampling timing.

When the input of the sampling rate adjustor 3 is coupled to a receiving terminal signal, the sampling rate adjustor 3 comprises a resampling buffer 31 for buffering the receiving terminal signal at each sampling timing. Herein the sampling rate adjustor 3 is specifically for resampling, for each current sampling timing, a receiving terminal signal in the resampling buffer 31 by means of interpolation according to the sampling rate mismatch of the transmitting and receiving terminals of the current sampling timing, so as to obtain a receiving terminal signal that has the same sampling rate as the sampling rate of the transmitting terminal signal at the current sampling timing.

As can be seen, although the time delay estimator 1 needs to use transmitting and receiving terminal signals simultaneously and the sampling rate adjustor 3 needs to use a transmitting terminal signal or a receiving terminal signal, the transmitting terminal signals used thereby may be different, and the receiving terminal signals used thereby may also be different. In order to avoid mutual influence between the time delay estimator 1 and the sampling rate adjustor 3 and enhance the data processing speed, this embodiment utilizes of mode of respectively providing a receiving terminal buffer and a transmitting terminal buffer for the time delay estimator 1, and a transmitting terminal resampling buffer or a receiving terminal resampling buffer for the sampling rate adjustor 3.

Resampling can be carried out by polynomial interpolation, linear interpolation or other general resampling means. With linear interpolation as an example, if the transmitting terminal signal is resampled, e.g., the scenario shown in FIG.

4, the resampled transmitting terminal signal can be expressed as:

$$y'[n]=(n\cdot(1+dFs_E)+1-\lfloor n(1+dFs_E)\rfloor)y[\lfloor n\cdot(1+dFs_E)\rfloor]+\\(n\cdot(1+dFs_E)-\lfloor n\cdot(1+dFs_E)\rfloor)y[\lfloor n\cdot(1+dFs_E)\rfloor+1]$$

where, $\lfloor \bullet \rfloor$ indicates a downward rounding operation, y'[n] represents the transmitting terminal signal of the sampling timing n after the resampling.

If the receiving terminal signal is resampled, the resampled receiving terminal signal can be expressed as:

$$x'[n]=(n/(1+dFs_E)+1-\lfloor n/(1+dFs_E)\rfloor)x[\lfloor n/(1+dFs_E)\rfloor]+\\(n/(1+dFs_E)-\lfloor n/(1+dFs_E)\rfloor)x[\lfloor n/(1+dFs_E)\rfloor+1]$$

where, $\lfloor \bullet \rfloor$ indicates a downward rounding operation, x'[n] represents the receiving terminal signal of the sampling timing n after the resampling.

Thus, online sampling rate mismatch correction is achieved. The transmitting terminal signal and the receiving terminal signal having the same sampling rate after corrected are sent to an echo cancellation system to carry out echo cancellation.

The devices in this embodiment do not need additional special configuration. For example, the time delay estimator 1 can be implemented by a buffer, a transfer function estimator 13 and a time delay calculator 14. The transfer function estimator 13 can be implemented by a multiplier, an integrator, a divider and an inverse Fourier converter. The time delay calculator 14 can be implemented by a multiplier, a divider and a comparator.

From the above, this embodiment carries out the sampling rate mismatch correction based on the transmitting and receiving terminal signals, does not need to monitor the sampling clocks of the transmitting and receiving terminals and thus does not need additional hardware setup, which reduces the requirement to the hardware performance and saves the system cost.

Furthermore, the embodiments of the invention use the characteristic that the transmission time delay and the sampling rate mismatch have a linear relationship, and adopt the technical means of obtaining the transmission time delay between the transmitting and receiving terminals based on the transmitting and receiving terminal signals and parameter fitting a sampling rate mismatch between the transmitting and receiving terminals, thus a high-precision sampling rate mismatch can be obtained in real time without additional hardware cost. The calculation method is simple, and the system cost is reduced. Further, since this solution uses the technical means of correcting the sampling rate mismatch before the operation of echo cancellation, the burden on the echo cancellation system is reduced and the quality of the echo cancellation is improved.

Figure 5:
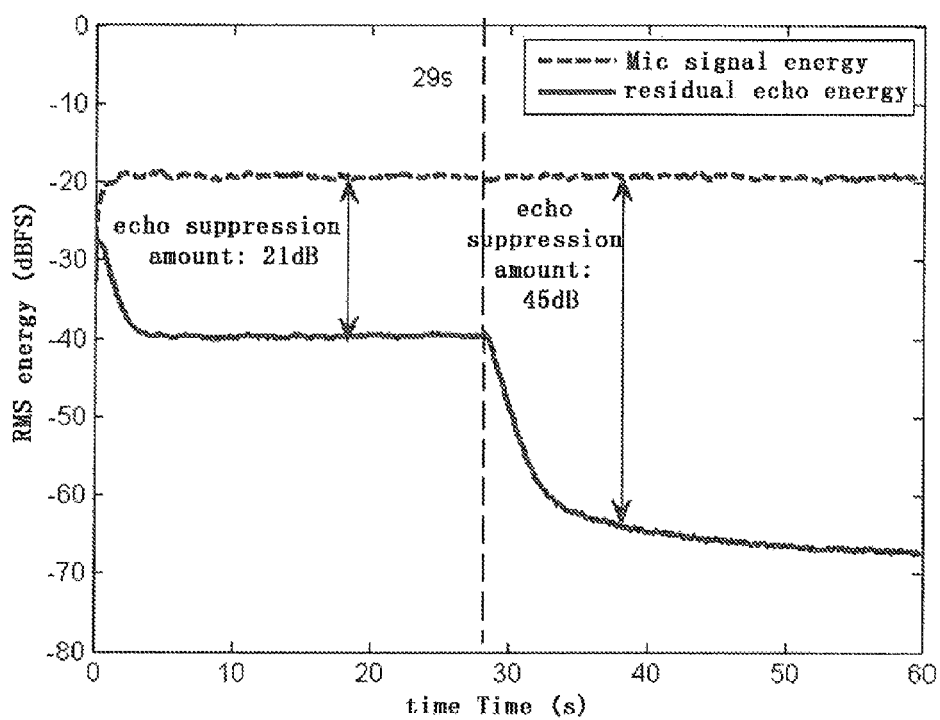
FIG. 5 is a diagram of the experimental result of the echo eliminating effect before and after the sampling rate correction as provided by the embodiments of the invention.

In the following the beneficial effects of the embodiments of the invention are described in combination with a diagram of the experimental result. FIG. 5 is a diagram of the experimental result of the echo eliminating effect before and after the sampling rate mismatch correction. The expected sampling rate of the transmitting and receiving terminals is 16000 Hz, the existing sampling rate mismatch is 0.9 Hz, and the correction to the sampling rate mismatch starts at the 29$^{th}$ second. Before the 29$^{th}$ second, the transmitting and receiving terminal signals having a sampling rate mismatch are input into an echo cancellation system, while 29 seconds later, the transmitting and receiving terminal signals with the same sampling rate obtained by the solution are input into the echo cancellation system.

In FIG. 5, the ordinate is RMS (root mean square error) Power (energy), and the abscissa is time. The dashed line in the figure is the energy curve of the transmitting terminal (Mic) signal, and the solid line is the energy curve of the residual echo that is output from the echo cancellation system. The difference between these two curves is echo suppression amount. As can be seen, before the correction of the sampling rate mismatch (before the 29 h second), the echo suppression amount can reach only 21 dB; while after the correction (after the 29$^{th}$ second), the echo suppression amount can exceed 45 dB. This verifies that this solution can significantly improve the echo eliminating effect.

The foregoing is only a preferred embodiment of the present invention, and it is not used for limiting the protection scope of the present invention. Any modification, equivalent replacement and improvement within the spirit and principles of the present invention should be included in the protection scope of the present invention.

The invention claimed is:

1. A method for sampling rate mismatch correction of transmitting and receiving terminals, wherein the method comprises:
    calculating a transfer function of a receiving terminal signal relative to a transmitting terminal signal at each sampling timing according to the transmitting and receiving terminal signals;
    obtaining a transmission time delay of the transmitting and receiving terminals at each sampling timing using the transfer function;
    obtaining a sampling rate mismatch of the transmitting and receiving terminals at each sampling timing by means of parameter fitting using the transmission time delay and the linear relationship between the transmission time delay and the sampling rate mismatch; and
    adjusting the sampling rate of the transmitting terminal signal or the receiving terminal signal at each sampling timing according to the sampling rate mismatch, to achieve the sampling rate correction; and inputting the transmitting terminal signal and the receiving terminal signal that have the same sampling rate after corrected to an echo cancellation system to carry out echo cancellation.

2. According to the method of claim 1, wherein the calculating a transfer function of a receiving terminal signal relative to a transmitting terminal signal at each sampling timing according to the transmitting and receiving terminal signals comprises:
    for each current sampling timing,
    generating a transmitting terminal data frame of the current sampling timing using the transmitting terminal signal of the current sampling timing and a predetermined number of transmitting terminal signals before the current sampling timing; and meanwhile generating a receiving terminal data frame of the current sampling timing using the receiving terminal signal of the current sampling timing and a predetermined number of receiving terminal signals before the current sampling timing; and
    calculating the transfer function of the receiving terminal signal relative to the transmitting terminal signal of the current sampling timing using the transmitting terminal data frame and the receiving terminal data frame of the current sampling timing by the following formula:

$$h = \mathit{ifft}(H)$$

$$H = \frac{E(X^*[k]Y[k])}{E(X^*[k]X[k])}$$

where, h is the transfer function, X[k] is the frequency domain form of the receiving terminal data frame $\vec{x}[n]$ of the current sampling timing n, Y[k] is the frequency domain form of the transmitting terminal data frame $\vec{y}[n]$ of the current sampling timing n, H is the frequency domain form of the transfer function h, X*[k] is a conjugate of X[k], E(•) indicates expectation calculation, ifft(•) represents inverse Fourier transform.

3. According to the method of claim 1, wherein the obtaining a transmission time delay of the transmitting and receiving terminals at each sampling timing using the transfer function comprises:
for each current sampling timing,
selecting the time point, to which the maximum absolute value of the transfer function of the current sampling timing corresponds, as a transmission time delay estimation value of the transmitting and receiving terminals of the current sampling timing; and
obtaining the transmission time delay of the transmitting and receiving terminals of the current sampling timing according to the transmission time delay estimation value.

4. According to the method of claim 1, wherein the obtaining a sampling rate mismatch of the transmitting and receiving terminals at each sampling timing by means of parameter fitting using the transmission time delay and the linear relationship between the transmission time delay and the sampling rate mismatch comprises:
for each current sampling timing,
generating a transmission time delay data frame of the current sampling timing using the transmission time delay of the transmitting and receiving terminals of the current sampling timing and a predetermined amount of transmission time delays of the transmitting and receiving terminals before the current sampling timing; and
obtaining the sampling rate mismatch of the transmitting and receiving terminals of the current sampling timing by parameter fitting each of the elements in the transmission time delay data frame relative to each sampling timing using the linear relationship between the transmission time delay and the sampling rate mismatch.

5. According to the method of claim 1, wherein the adjusting the sampling rate of the transmitting terminal signal or the receiving terminal signal at each sampling timing according to the sampling rate mismatch comprises:
for each current sampling timing,
resampling the transmitting terminal signal by means of interpolation according to the sampling rate mismatch of the transmitting and receiving terminals of the current sampling timing, and obtaining a transmitting terminal signal that has the same sampling rate as the sampling rate of the receiving terminal signal at the current sampling timing;
or, resampling the receiving terminal signal by means of interpolation according to the sampling rate mismatch of the transmitting and receiving terminals of the current sampling timing, and obtaining a receiving terminal signal that has the same sampling rate as the sampling rate of the transmitting terminal signal at the current sampling timing.

6. A system for sampling rate mismatch correction of transmitting and receiving terminals, wherein said system comprises a time delay estimator, a sampling rate mismatch estimator and a sampling rate adjustor, wherein
the input of the time delay estimator is coupled to a transmitting terminal signal and a receiving terminal signal; the output of the time delay estimator is connected to the input of the sampling rate mismatch estimator, the output of the sampling rate mismatch estimator is connected to the input of the sampling rate adjustor; the input of the sampling rate adjustor is also coupled to the transmitting terminal signal or the receiving terminal signal; and the output of the sampling rate adjustor is connected to an echo cancellation system;
the time delay estimator is configured to calculate a transfer function of the receiving terminal signal relative to the transmitting terminal signal at each sampling timing according to the transmitting and receiving terminal signals, and obtain a transmission time delay of the transmitting and receiving terminals at each sampling timing using the transfer function;
the sampling rate mismatch estimator is configured to obtain a sampling rate mismatch of the transmitting and receiving terminals at each sampling timing by means of parameter fitting using the transmission time delay and the linear relationship between the transmission time delay and the sampling rate mismatch; and
the sampling rate adjustor is configured to adjust the sampling rate of the transmitting terminal signal or the receiving terminal signal at each sampling timing according to the sampling rate mismatch to achieve sampling rate correction, and inputting the transmitting terminal signal and the receiving terminal signal that have the same sampling rate after corrected to an echo cancellation system to carry out echo cancellation.

7. According to the system of claim 6, wherein the time delay estimator comprises a transmitting terminal buffer, a receiving terminal buffer and a transfer function estimator,
the transmitting terminal buffer is configured to buffer the transmitting terminal signal of each sampling timing;
the receiving terminal buffer is configured to buffer the receiving terminal signal of each sampling timing;
the transfer function estimator is configured to generate, for each current sampling timing, a transmitting terminal data frame of the current sampling timing using the transmitting terminal signal of the current sampling timing and a predetermined number of transmitting terminal signals before the current sampling timing in the transmitting terminal buffer, meanwhile generate a receiving terminal data frame of the current sampling timing using the receiving terminal signal of the current sampling timing and a predetermined number of receiving terminal signals before the current sampling timing in the receiving terminal buffer, and calculate the transfer function of the receiving terminal signal relative to the transmitting terminal signal of the current sampling timing using the transmitting terminal data frame and the receiving terminal data frame of the current sampling timing by the following formula:

$$h = ifft(H)$$
$$H = \frac{E(X^*[k]Y[k])}{E(X^*[k]X[k])}$$

where, h is the transfer function, X[k] is the frequency domain form of the receiving terminal data frame $\vec{x}[n]$ of the current sampling timing n, Y[k] is the frequency domain form of the transmitting terminal data frame $\vec{y}[n]$ of the current sampling timing n, H is the frequency domain form of the transfer function h, X*[k] is a conjugate of X[k], E(•) indicates expectation calculation, ifft(•) represents inverse Fourier transform.

8. According to the system of claim 7, wherein the time delay estimator further comprises a time delay calculator,
the time delay calculator is configured to select, for each current sampling timing, the time point, to which the maximum absolute value of the transfer function of the current sampling timing corresponds, as a transmission time delay estimation value of the transmitting and receiving terminals of the current sampling timing, and obtain the transmission time delay of the transmitting and receiving terminals of the current sampling timing according to the transmission time delay estimation value.

9. According to the system of claim 6, wherein the sampling rate mismatch estimator comprises a time delay buffer and a time delay sampling rate mismatch fitter, the time delay buffer is configured to buffer the transmission time delay of the transmitting and receiving terminals at each sampling timing;

the time delay sampling rate mismatch fitter is configured to generate, for each current sampling timing, a transmission time delay data frame of the current sampling timing using a transmission time delay of the transmitting and receiving terminals of the current sampling timing and a predetermined number of transmission time delays of the transmitting and receiving terminals before the current sampling timing in the time delay buffer, and obtain a sampling rate mismatch of the transmitting and receiving terminals of the current sampling timing by parameter fitting each of the elements in the transmission time delay data frame relative to each sampling timing according to the linear relationship between the transmission time delay and the sampling rate mismatch.

10. According to the system of claim 6, wherein the sampling rate adjustor comprises a resampling buffer;

the resampling buffer is configured to buffer the transmitting terminal signal of each sampling timing when the input of the sampling rate adjustor is coupled to a transmitting terminal signal, and the sampling rate adjustor is specifically for resampling, for each current sampling timing, a transmitting terminal signal in the resampling buffer by means of interpolation according to the sampling rate mismatch of the transmitting and receiving terminals of the current sampling timing, so as to obtain a transmitting terminal signal that has the same sampling rate as the sampling rate of the receiving terminal signal at the current sampling timing;

the resampling buffer is configured to buffer the receiving terminal signal of each sampling timing when the input of the sampling rate adjustor is coupled to a receiving terminal signal, and the sampling rate adjustor is specifically for resampling, for each current sampling timing, a receiving terminal signal in the resampling buffer by means of interpolation according to the sampling rate mismatch of the transmitting and receiving terminals of the current sampling timing, so as to obtain a receiving terminal signal that has the same sampling rate as the sampling rate of the transmitting terminal signal at the current sampling timing.

\* \* \* \* \*